United States Patent [19]
Klautschek

[11] 4,019,116
[45] Apr. 19, 1977

[54] COMMUTATION CIRCUIT FOR A CONVERTER

[75] Inventor: Herwig Klautschek, Furth, Germany

[73] Assignee: Siemens Aktiengesellschaft, Munich, Germany

[22] Filed: Nov. 25, 1975

[21] Appl. No.: 635,149

[30] Foreign Application Priority Data

Dec. 3, 1974 Germany .......... 2457109

[52] U.S. Cl. .......... 321/45 C; 321/2; 318/227
[51] Int. Cl.² .......... H02M 7/515
[58] Field of Search .......... 318/227, 345 R, 345 G; 321/2, 45 C

[56] References Cited

UNITED STATES PATENTS

| | | | |
|---|---|---|---|
| 3,538,419 | 11/1970 | Seki et al. | 321/45 C |
| 3,691,439 | 9/1972 | Jensen et al. | 318/227 |
| 3,717,807 | 2/1973 | Seki | 321/45 C X |
| 3,854,078 | 12/1974 | Hubner | 318/227 |
| 3,872,364 | 3/1975 | Hubner | 321/45 C X |
| 3,887,862 | 6/1975 | Hubner | 321/45 C |

OTHER PUBLICATIONS

IBM Technical Disclosure Bulletin, "Switch Voltage Regulator", E. A. Menard & J. R. Cielo, vol. 6, No. 8, Jan. 1964, pp. 31–32.

*Primary Examiner*—William M. Shoop
*Attorney, Agent, or Firm*—Kenyon & Kenyon Reilly Carr & Chapin

[57] ABSTRACT

A commutation circuit for a converter is disclosed. The circuit comprises an intermediate DC link which is coupled at one end to the converter and which includes a smoothing choke. A DC controller is coupled to the other end of the DC link and includes a controlled main valve and a quenching arrangement which is shunted across the main valve and comprises a quenching capacitor in series with controlled quenching valve. In accord with the invention the aforesaid smoothing choke and quenching capacitor serve as the respective quenching capacitor and quenching choke for sum quenching of the controlled valves of the converter.

6 Claims, 19 Drawing Figures

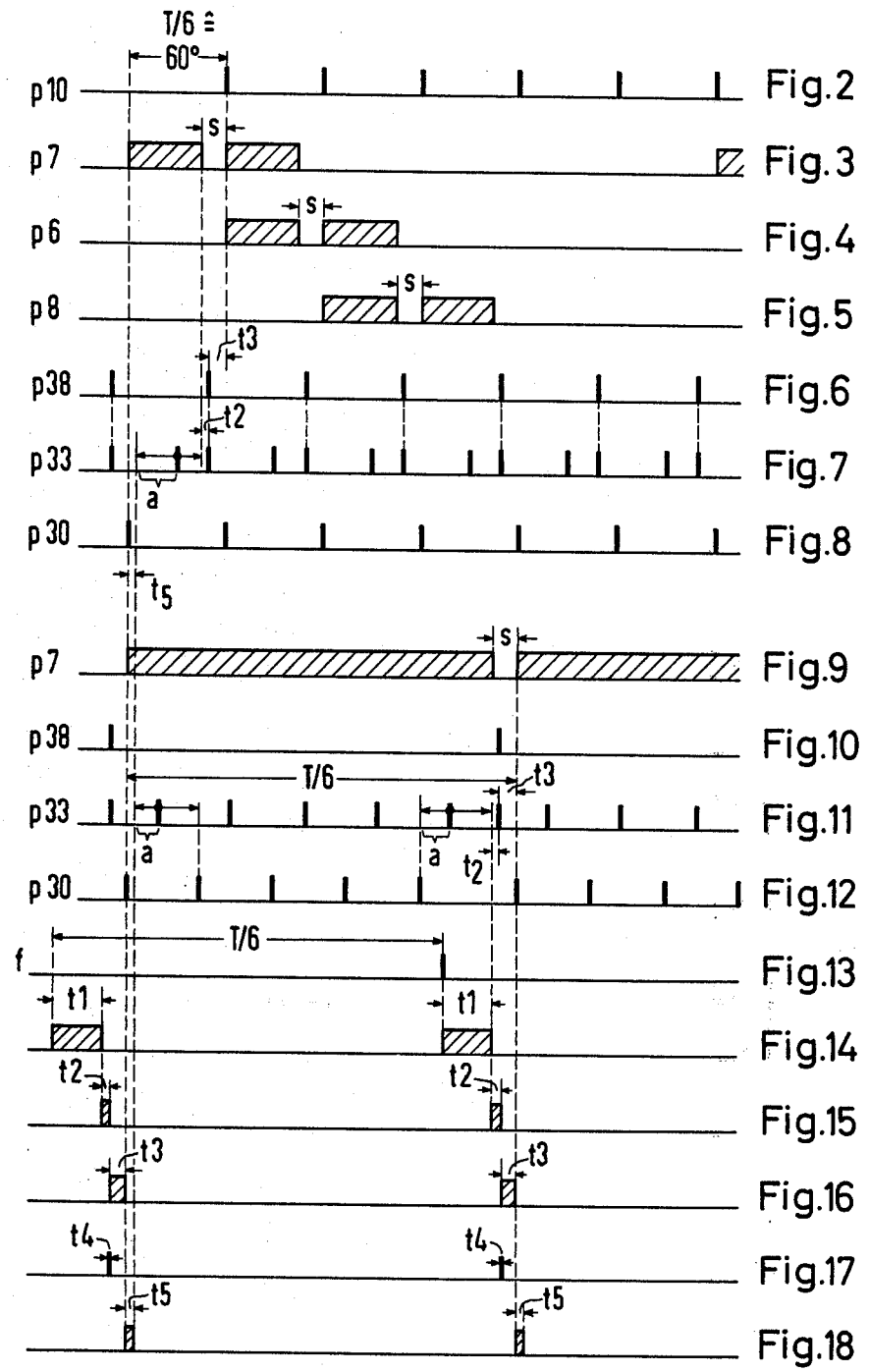

COMMUTATION CIRCUIT FOR A CONVERTER

BACKGROUND OF THE INVENTION

1. Field of the Invention

The invention concerns a commutation circuit for a p-pulse converter with controlled valves and, in particular, a commutation circuit of the type which includes an intermediate DC link which has a smoothing choke and which is connected to a controllable converter fed from a DC voltage source.

2. Description of the Prior Art

Intermediate-link converters having a smoothing choke and, thus, impressed current, in the intermediate DC link are known, for example, from the German Offenlegungsschrift 1,513,518. Such converters are used in variable-speed drives for rotating-field machines. In operation of a rotating-field machine as a motor, a converter operating as a rectifier supplies energy to the intermediate DC link from a three-phase network. The rectifier, equipped with controlled valves, receives control pulses from a control unit which is synchronized with the line voltage. A first converter, operating as an inverter, which is likewise equipped with controlled valves, is fed by the DC link and develops a rotary voltage of adjustable frequency for controlling the rotating-field machine. The inverter can be free-running or externally controlled by a control unit. The rotary voltage of the inverter develops freely, i.e., nearly independently of the waveshape of the voltage in the intermediate DC link, due to the decoupling effect of the smoothing choke arranged in the DC link. The current in the intermediate DC link remains constant during the commutation; therefore, only the DC current impressed by the smoothing choke needs to be commutated. For reversing the flow of energy, i.e., for operation as a generator, the intermediate-link voltage is reversed, with the direction of the current remaining the same. This is realized by changing the control angle of the first (on the machine side) converter, which is possible due to the absence of bypass valves.

It is also known to provide such an intermediate-link converter with a control circuit which ensures that the current in the intermediate DC link remains constant. This is taught, for example, in the German Offenlegungsschrift 1,814,400 and in "Siemens-Zeitschrift" 45, April, 1971, no. 4, pages 195 to 197 (Reprint).

In the area of intermediate-link converters which, contrary to the converters mentioned so far, do not operate with impressed DC current but with impressed DC voltage in the intermediate circuit, it is also known to form the converter from a first converter preceded by a second converter which is designed as a DC controller (See, e.g., German Offenlegungsschrift 2,050,787). The first converter, which supplies a rotating-field machine, includes controlled valves which are connected in a three-phase bridge circuit and across each of which is connected an uncontrolled bypass valve in antiparallel relationship. The DC controller comprises a controlled main valve and a quenching device which is shunted across the main valve and which includes a quenching capacitor, a controlled quenching valve and a commutating choke all connected in series. The quenching capacitor is also connected in series with a controlled recharging valve, which is fired together with the main valve, between the two inputs of the first converter. The DC controller is used in this case as the commutation circuit for the controlled valves of the first converter. If the main valve of the controller is quenched by the firing of the quenching valve, the input voltage of the first converter becomes zero, the current in the then current-carrying valves is extinguished and a bypass current begins to flow via the uncontrolled bypass valves. In an intermediate-link converter with impressed DC current in the intermediate DC link one cannot use a DC controller in the above manner (i.e., as the commutation circuit), as due to the absence of bypass valves in the first converter, the impressed intermediate-link current in the controlled main valve cannot be interrupted directly by firing the quenching valve of the DC controller.

In the area of intermediate-link converters which operate with impressed DC voltage in the intermediate link, it is also known to arrange in the intermediate link a separate commutation device which is utilized for sum-quenching of the controlled valves of the first converter (see, e.g., German Offenlegungsschrift 1,613,774). If one were to provide such a commutation device for an intermediate-link converter which operates with impressed DC current in the intermediate DC link, a considerable number of components and control devices would be required.

DC control elements (controllers) having various configurations figurations are also known from the German Auslegeschrift 1,180,833 and from the German Patent 1,242,289.

It is an object of the present invention to provide an improved intermediate-link converter of the type in which a p-pulse first converter is connected to a second controlled converter via an intermediate-link DC current. More particularly, it is an object of the present invention to provide for such an intermediate-link converter, a second controlled converter having little complexity, and, in addition, a commutation circuit for the first converter which works reliably and which can be inexpensively designed with a small number of components. It is a further object of the invention to provide a commutation circuit for the aforesaid first converter which responds quickly and is suitable for use with inductive loads, particularly loads comprising variable-speed drives of rotating-field machines.

SUMMARY OF THE INVENTION

In accordance with the principles of the present invention, the above and other objectives are accomplished by providing that the second controlled converter take the form of a DC control device (controller) comprising a controlled main valve and a quenching device which is shunted across the main valve and which comprises a quenching capacitor connected in series with a controlled quenching valve, and by further providing that the quenching capacitor of the DC control device or the smoothing choke of the intermediate DC link serve simultaneously as the quenching capacitor or the quenching choke, respectively, for the sum-quenching of the controlled valves of the first converter. Either the quenching capacitor or the smoothing choke is thus used for energy storage.

More particularly, the quenching capacitor is arranged so that one of its electrodes is connected directly with the one input of the first converter and so that the other of its electrodes is connected to the other input of the first converter via a controlled auxiliary valve in such a manner that, if the auxiliary valve is fired, the voltage of the charge-reversed quenching capacitor is present as a cutoff (reverse) voltage at the controlled valves of the first converter. With this arrangement, therefore, after the controlled quenching valve and the controlled auxillary valve are fired, the DC voltage of the DC voltage source feeding the second converter is present at the two inputs and thus, at the controlled valves of the first converter, with the polarity of a cutoff voltage. With each firing of the auxiliary valve, a sum-quenching of the controlled valves of the first converter is thus performed. Moreover, with this arrangement only a relatively small number of components are needed. One specific embodiment of the invention to be described herein is characterized by the following features: the DC control device is arranged in the one of the connecting lines and the smoothing choke in the other of the connecting lines which are used to connect a DC voltage source to the first converter; the smoothing choke and a bypass ("freewheeling") valve connected in series with it and poled in the reverse direction are connected across the two inputs of the first converter; the clock frequency of the DC control device is selected to be at least p-times higher than the output frequency of the first converter, where p is the number of pulses of the latter; and the auxiliary valve of the DC control device, which is in series with the controlled quenching valve of the DC control device, is connected to that input of the first converter to which the smoothing choke is connected, wherein the auxiliary valve and the quenching valve can always be fired simultaneously every 360° el/p.

In the above arrangements, the DC control device and the first converter must be synchronized in such a manner that the command for initiating the commutation of the first converter can be given only if the main valves of the DC control device is cut off. To fulfil this requirement, it is advantageous to use a control arrangement which delivers not only firing pulses to the main valve and the quenching valve of the DC control device, but also firing pulses to the controlled valves of the first converter and the auxiliary valve as well. Moreover, it is further advantageous to use a control arrangement which is acted upon a control signal determining the duty cycle of the DC control device and, additionally, also by a frequency control signal from a frequency generator which has p-times the output frequency of the first converter.

BRIEF DESCRIPTION OF THE DRAWINGS

The above and other features and aspects of the present invention will become more apparent upon reading the following detailed descriptions in conjunction with the accompanying drawings in which:

FIGS. 2 to 18 show timing diagrams for the firing pulses of different valves of the converter of FIG. 1 and also signals for the control unit of such converter.

DETAIL DESCRIPTION

Figure 1:
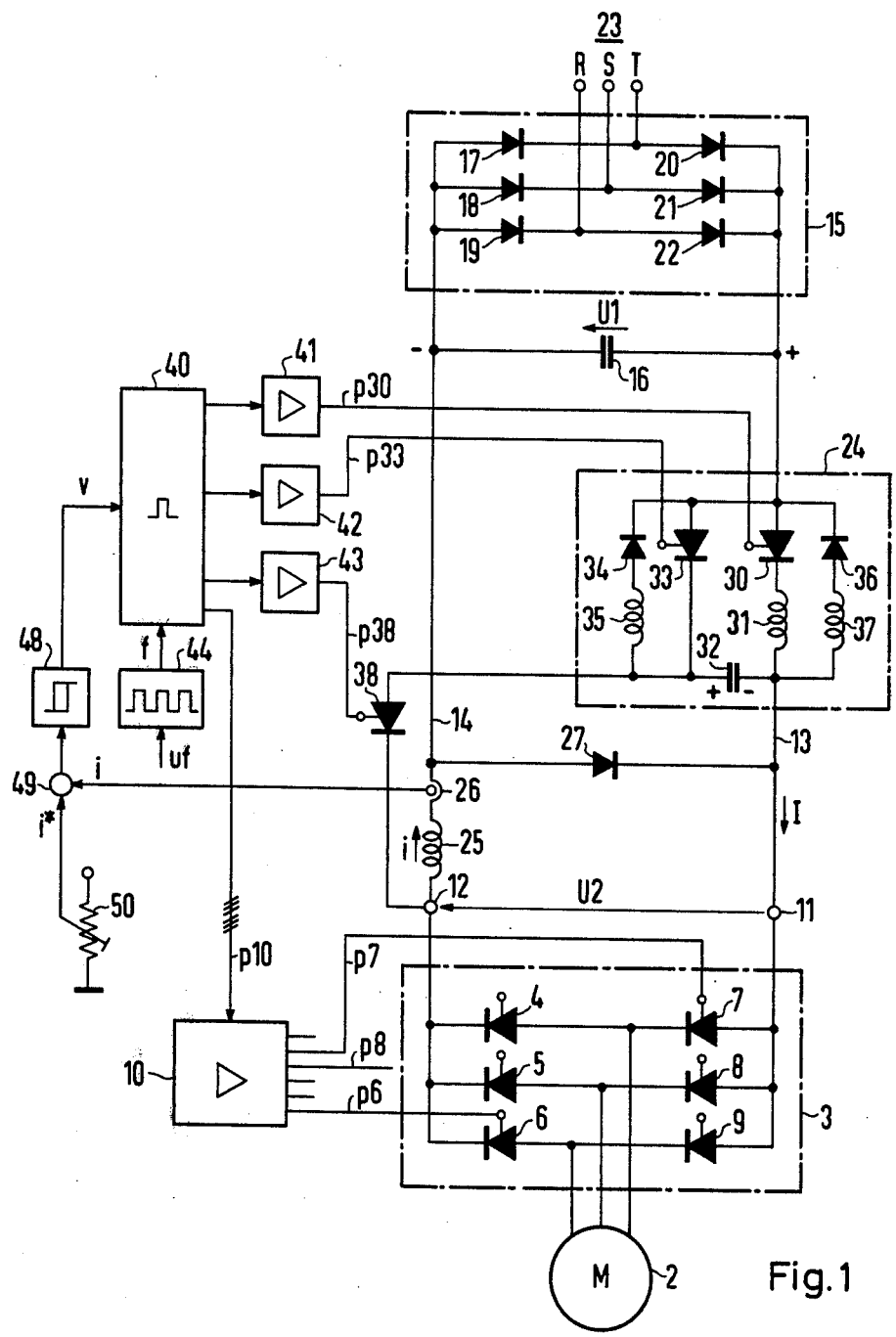
FIG. 1 illustrates an intermediate-link converter having a commutation arrangement in accordance with the principles of the present invention.

FIG. 1 illustrates an intermediate-link converter comprising a p-pulse first converter 3, shown illustratively as having p=6 pulses, which is being employed to drive a load 2 which is in the form of a rotating-field machine. The load 2 may be a synchronous machine or also an asynchronous machine which is being used, for example, for the propulsion of a vehicle. The first converter 3 includes six controlled valves 4 to 9 which are shown as thyristors (SCR's) and which are arranged in a three-phase bridge circuit. The valves 4 to 9 are fed by a pulse amplifier 10 which, in turn, is driven by firing pulses p10. As can be seen, the converter 3 need not include bypass valves nor need it include a separate commutating device with a number of controlled or uncontrolled valves and commutating capacitors.

The two inputs 11 and 12 of the first converter 3 are fed a variable DC input voltage U2. These inputs moreover are connected via respective positive and negative connecting lines 13 and 14 to the output terminals of a DC voltage source 15. The latter source 15 delivers at such terminals, a DC output voltage U1 which may be, for example, 500 V, and which is kept smooth by a smoothing capacitor 16 also connected between the terminals. As shown, the DC voltage source 15 comprises a rectifier having uncontrolled valves 17 to 22 in a three-phase bridge circuit. The rectifier is connected to a three-phase network 23 with the phase conductors R, S, T. The present intermediate-link converter operates with a high power factor at the three-phase network 23.

In the positive connecting line 13, there is connected between the positive output of the DC voltage source 15 and the input 11 of the first converter 3, a DC control device 24 which forms a second converter. In the negative connecting line 14, there is connected between the input 12 of the first converter 3 and the negative pole of the DC voltage source 15, a smoothing choke 25. It is important to note that the DC control device 24 is arranged in the one and the smoothing choke 25 in the other of the connecting lines 13, 14.

For measuring the current in the smoothing choke 25, a current transformer 26 is further provided. A uncontrolled bypass (or "freewheeling") valve 27 connects the negative connecting line 14 with the positive connecting line 13, the valve being poled in the direction of the latter line. The valve 27, moreover, is arranged so that it is connected in series with the smoothing choke 25 between the two inputs 12 and 11 of the first converter 3.

The DC control device 24 comprises a controlled main valve 30, shown as a thyristor, which is connected in series with a choke 31, the latter being provided for limiting the current rise in the main valve 30, between the positive pole of the DC voltage source 15 and the input 11 of the converter 3. The DC control device 24 further comprises a quenching device which is shunted across the series circuit comprising the main valve 30 and the choke 31. By means of this device, the main valve 30 can be extinguished. More particularly, the quenching device comprises a quenching capacitor 32 having one end connected with the cathode of a controlled quenching valve 33. The other anode end of the quenching valve 33, in turn, is connected directly with the anode of the controlled main valve 30, while the other end of quenching capacitor 32 faces toward and is connected with line 13 of the intermediate DC link. An uncontrolled swingback valve 34 in series with a swingback choke 35 is connected antiparallel to the quenching valve 33. The series circuit comprising the main valve 30 and the choke 31 is further shunted, anti-parallel by a series circuit which includes an uncontrolled swingback valve 36 poled in the cutoff direction of the main valve 30 and a swingback choke 37.

The uncontrolled bypass valve 27 carries the load current during the no-current intervals of the main valve 30.

A controlled auxiliary valve 38 is also provided. The auxiliary valve 38, which may be a thyristor, is arranged in series with the controlled quenching valve 33 of the DC control device 24. Its cathode is connected to that particular one of the two inputs 11, 12 of the first converter 3 which is tied to the smoothing choke 25; in the present case, therefore, to the input 12.

It should be mentioned that the DC control device 24 may also be arranged in the negative connecting line 14 and the smoothing choke 25 in the positive connecting line 13. In such case, the controlled auxiliary valve 38 would be connected with its anode to the input 11 and with its cathode to the anode of the quenching valve 33.

A control unit 40 is additionally provided for forming and transmitting firing pulses for all controlled valves 4 to 9, 30, 33 and 38. In particular, control unit 40 delivers, via a pulse amplifier 41, firing pulses p30 to the main valve 30, via a pulse amplifier 42, firing pulses p33 to the quenching valve 33 and, via a pulse amplifier 43, firing pulses p38 to the auxiliary valve 38. At the same time, it also delivers, via p=6 channels, firing pulses p10 to the pulse amplifier 10. For an output frequency of 50 Hz, the latter amplifier delivers a total of 300 pulses per second, for example, as the firing pulses p7 to the valve 7.

A frequency generator 44, which transmits a frequency control signal $f$, is connected to the frequency control input of the control unit 40. The frequency control signal f has a frequency which is $p$-times that of the desired output frequency of the first converter 3. For a desired output frequency of, for example, 50 Hz, the frequency generator 44, therefore, delivers as the frequency control signal f 300 pulses per second for the case where $p=6$ and a 6-pulse converter 3 is provided. Preferably, the frequency of the frequency control signal f is adjustable. This is realized by application of a frequency control voltage $u_f$ to the generator 44, the latter voltage being derived, for example, from a potentiometer (not shown) or from a control circuit. The frequency generator 44 may typically be voltage-to-frequency converter.

The control input of the control unit 10 is fed a control signal v developed by a current regulator 48. The latter regulator, in turn, is fed the output of a comparator 49 whose inputs are the actual current valve i in the smoothing choke determined by the current transformer 26 and a set-point (reference) current value $i^*$ delivered by an adjustable setpoint transmitter 50. In the present case, a potentiometer is employed as the setpoint transmitter 50. However, a high-priority control loop may also be employed. As can be appreciated, the control signal v ensures that the actual current value i follows the setpoint value $i^*$. This is accomplished by the unit 40 varying the duty cycle of the DC control device 24 as a function of the signal v.

The operation of the intermediate-link converter of FIG. 1 will now be described for three operating cases.

OPERATING CASE 1

In this operating case, the auxiliary valve 38 has not received firing pulses p38 for some time and, hence, remains cut off. As a result, sum quenching of the valves 4 to 9 does not take place and the DC control device 24 is operated in the usual manner.

More particularly, let us first consider a condition in which the main valve 30 of the DC control unit 24 and the controlled valves 6 and 7 of the converter 3 are fired. The intermediate-link DC current $I = i$ then flows along the path 15-30-31-13-11-7-2-6-12-25-26-14-15, and the quenching capacitor 32 is charged with a polarity opposite to that shown, approximately to the level of the DC voltage U1.

If the intermediate-link DC current I is now to be commutated from the main valve 30 to the bypass valve 27, then a firing pulse p33 is delivered to the quenching valve 33. The DC current I is immediately transferred to the now fired quenching valve 33. Thereupon, a reversing process takes place, in which the charge of the quenching capacitor 32 is reversed through the path via the swingback choke 37 and the swingback valve 36 as well as the quenching valve 33, until it has reached approximately the level of the DC voltage U1 with the charge reversed and the polarity shown. The main valve 30 is quenched in this process. At the instant the voltage at the charge-reversed quenching capacitor 32 has reached the value of the DC voltage U1, the DC current I = passes to the bypass valve 27 and the current now flows along the path 11-7-2-6-12-25-26-27. Also, the DC control device 24 is now cut off and the quenching capacitor 32 now has the polarity shown.

If the DC control device 24 is to be switched into conduction again, a firing pulse p30 is again applied to the main valve 30. Upon application of the pulse p30, the DC current I is caused to pass immediately from the bypass valve 27 to the main valve 30. In addition, a reversed process takes place in the DC control device 24, in which the charge of the quenching capacitor 32 is reversed via the swingback choke 35, the swingback valve 34, the main valve 30 and the choke 31, until its voltage has again reached approximately the level of the DC voltage U1, with the reversed polarity as shown. At this point, the assumed initial condition is again reached.

If the output frequency of the converter 3 is low, the above-described commutation from the main valve 30 to the bypass valve 27 and back can be repeated several times, until the next firing pulse p38 arrives at the auxiliary valve 38 and commutation in the converter 3 is initiated. In this manner, the means value of the DC current in the intermediate-link is adjusted between successive firing pulses p38 and is held at the present reference value $i^*$. In this case, moreover, no commutation from one of the valves 4 to 9 to another takes place.

OPERATING CASE 2

In this operating case, a firing pulse p38 is transmitted to the auxiliary valve 38 simultaneously with the transmission of a firing pulse p33 to the quenching valve 33. This initates the commutation in the converter 3.

Let it be assumed that the DC control device 24 is in a cut-off state. The charge of the quenching capacitor 32 is thus reversed to approximately the DC voltage U1 with the polarity shown, and the bypass valve 27 carries the DC current $I = i$ flowing through the two fired valves 6 and 7, for example.

The commutation of the DC current I to the next phase of the load 2 is initiated by first simultaneously firing the two valves 33 and 38 with the firing pulses p33 and p38, respectively. This enables a current to flow from the positive pole of the DC voltage source 15 via the quenching valve 33, the auxiliary valve 38, the input 12, the smoothing choke 25, the DC current transformer 26 to the negative pole of the DC voltage source 15. The entire DC voltage source 15 thus appears at the smoothing choke 25. The latter voltage at the smoothing choke 25, which now is also acting as a quenching choke for the converter 3, is applied via the bypass valve 27 to the inputs 12, 11 of the converter 3 and, therefore, in the cut-off direction of the valves 4 to 9. The DC voltage U1 at the choke 24 hence functions in this case as a commutating voltage. The DC voltage U1 is also simultaneously present at the quenching capacitor 32, which is shunted across the inputs 11, 12, in the cut-off direction of the valves 4 to 9. The quenching capacitor 32 thus also serves in this case as the quenching capacitor for the converter 3.

The aforesaid counter or commutating voltage across the series-connected valves 6, 7 reduces the DC current I in the load 2 which is being held by the stray inductances of such load. The DC current I is thus reduced to zero very quickly, and the two controlled valves 6 and 7 become extinguished. After the machine current has become zero, a switching state results in which the converter 3 carries no current and a DC current i flows from the positive pole of the DC voltage source 15 via the quenching valve 33, the auxiliary valve 38, the smoothing choke 25 and the current transformer 26 to the negative pole of the DC voltage source 15. After waiting for the protection time of the controlled valves 4 to 9 of the converter 3 to expire, the main valve 30 can now be fired, together with the valves 6 and 8 of the converter 3, which follow in the firing sequence.

Through the firing of the main valve 30, the quenching capacitor 32, which at first still has the polarity shown, is recharged via the path 35-34-30-31 to the opposite polarity and to approximately the DC voltage U1. Additionally, with the firing of the main valve 30, the DC current i passes immediately to the main valve 30 and the quenching valve 33 is extinguished. The latter current now flows via the path 15-30-31-32-38-12-25-26-14-15. It continues to flow via this path so that the quenching capacitor 32 is charged beyond the value of the DC voltage U1. This higher capacitor voltage now appears in the forward direction at the valves 4 to 9, thereby ensuring that the DC current I and, as a result, the current through the valve combination 8, 6, which has been refired in the meantime, is again built up quickly.

To the extent that the DC current I, which flows through the valve 8, the load 2 and the valve 6, is building up, the current flowing through the auxiliary valve 38 is reduced. After this current has become zero, a switching state is reached in which the DC current I = i flows via the path 15-30-31-11-3-2-12-25-26-14-15. At this time, the quenching valve 33 is again fired by a firing pulse p33, but now without simultaneously firing the auxiliary valve 38. This last firing restores the switching state of the circuit to its original condition.

It should be noted that in the present commutation circuit of FIG. 1 a commutation process in the converter 3 is simultaneously always accompanied by a switching process in the DC control device 24 from the blocked to the current-conducting switching state.

OPERATING CASE 3

The above-described Operating Cases 1 and 2 can occur in operation one after the other (Operating Case 3). This is shown by way of an example in FIGS. 2 to 18. If the output frequency of the converter 3 is low, Operating Case 1 will occur several times for a given fired pair of valves (e.g., the valves 6, 7 of the converter 3). At the instant when the converter 3 is to be switched from one phase of the load 2 to the next, the valves 33, 38 are then fired together. After completion of the sum-quenching, the next pair of valves of the converter 3 is fired together with the main valve 30.

It should be pointed out that the auxiliary valve 38 can also be used in another manner for sum-quenching the controlled valves 4 to 9 of the converter 3. In this case, the auxiliary valve 38 is fired at an instant when the charge of the quenching capacitor 32 is reversed and has the polarity shown. The firing, therefore, takes place again in the cut-off state of the DC control device 25. However, the quenching valve 33 is not also simultaneously fired. After the auxiliary valve 38 is fired, the voltage of the charge-reversed quenching capacitor 32 is present as a reverse voltage at those valves which are then carrying the current flowing via the bypass valve 27. These valves are thereby extinguished.

FIGS. 2 to 8 further illustrate the above-described operation of the arrangement of FIG. 1. FIG. 2 shows the firing signal p10, from which, after amplificaton, the firing pulses for the valves 4 to 9 are obtained. FIGS. 3 to 5, in turn, illustrate the firing p7, p6, p8 developed for the valves 7, 6, 8, respectively. From these figures, it can be seen that the valves 6, 7 are first fired simultaneously and then the valves 6, 8 are fired simultaneously. A double pulse is therefore present in each period T for each valve. As indicated, the two individual pulses for each valve are separated by a safety spacing s.

FIG. 6 shows the firing pulses p38 for the auxiliary valve 38. Each of these firing pulses p38 initiates a sum-quenching of the valves 4 to 9. The auxiliary valve 38 is always fired with a time spacing t3 before the firing of the following converter valves.

FIG. 7 illustrates the firing pulses p33 for the quenching valve 33 for a comparatively high output frequency for the converter 3. As can be seen, the quenching valve 33 receives two kinds of quenching pulses. A first or synchronous kind of firing pulse is the type of pulse which is transmitted simultaneously with the firing pulse p38 for the auxiliary valve 38. A second or adjustable kind of pulse is the type which can be adjusted in dependence on the control signal v. As shown, there is a single firing pulse of the second kind between two firing pulses of the first kind. Also, the adjustablity of the firing pulses p33 of the second kind is indicated by a horizontal double arrow. The latter double arrow extends from a point in time which is latter than the firing instant of the pulse p30 shown in FIG. 8 for the main valve 30 by a time t5, to a point in time which is before the next firing pulse p33 of the synchronous kind by the time t2. The reference symbol a designates the current conduction period or "on" time of the DC control device, which can be set by the control signal v. The higher the DC voltage U2 in FIG. 1, the longer is the on-period a.

FIGS. 9 to 12 will now be considered. These figures correspond to FIGS. 3, 6, 7 and 8 for a lower output frequency for the first converter 3. The latter frequency is about one-quarter of the frequency which was used in the case of FIGS. 2 to 8. Between two firing pulses p38 which initiate the sum-quenching of the converter 3, there is now more than one commutation from from the main valve 30 to the bypass valve 27. From FIG. 11, it can be seen that four such commutations occur between two firing pulses p38. Thus, the number of commutations increases with decreasing output frequency. The symbol a again designates the "on"-time of the DC control device 24, which can be set by the control signal v. A double arrow in FIG. 11 indicates the adjustability of the "on"-time a.

Figure 19:
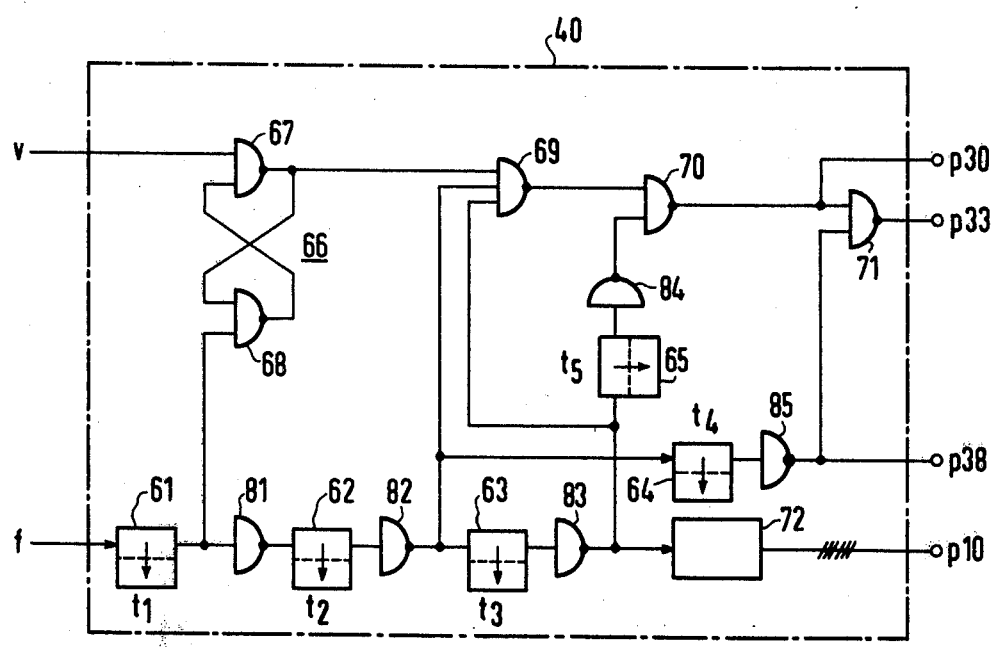
FIG. 19 shows an arrangement which can be used for the control unit of the converter of FIG. 1.

FIG. 19 shows the control unit of FIG. 1 in greater detail. As shown, the unit 40 comprises five time delay stages 61 to 65, a memory stage 66 with two NAND gates 67, 68, one NAND gate 69 with three inputs, two NAND gates 70, 71 with two inputs, a ring distributor 72 and a number of inverter stages 81 to 86. The unit is designed so that either only the rising flank or only the falling flank of the respective input signals to the components 61 to 65 cause the latter to switch or change state. This is the reason for providing the individual inverter stages 81 to 85. The latter inverter stages, therefore, need not be discussed in detail.

As indicated in FIG. 19, the time delay stage 61 is applied to the frequency control signal f. The signal f is illustrated in FIG. 13 which shows only the positions of the falling flanks of the individual pulses of the signal, the position of the rising flanks being unimportant for the present discussion. The delay stage 61 forms from the frequency control signal f the output signal shown in FIG. 14. This output signal comprises individual pulses of duration t1, whose rising flanks coincide with the aforesaid falling flanks of the signal f. The time t1 is adjustable as a time delay at the delay stage 61. The delay stage 61 has the effect of permitting, during the time t1, the DC control device 24 to be switched only from the conducting to the cut-off state, but not the other way. For the maximum output frequency of the converter 3, the time t1 is chosen as $t1 = kT/p$, where T is the period of the output frequency of the converter, p is the number of pulses of the converter 3 and k is a factor between about 0.7 and 0.8.

The output signal of the delay stage 61 is fed, via the inverter stage 81, to the delay stage 62. The latter forms an output signal therefrom whose waveform is shown in FIG. 15. The signal in FIG. 15 comprises pulses whose rising flanks coincide in time with the falling flanks of the pulses in FIG. 14, and whose duration t2 is somewhat shorter than the duration t1. The time t2 is a safety period and is adjusted at the delay stage 62. It is chosen somewhat longer than the time which the DC control device 24 requires from commutation of the current from the main valve 30 to the bypass valve 27. The effect of the delay stage 62 is to ensure that the DC control unit 24, if it is still in the conducting state, will be cut-off not later than at the end of the period t2.

The output signal of the delay stage 62 is fed to the input of the delay stage 63 via the inverter stage 82. The delay t3 of the delay stage 63 is adjusted to a value which is obtained from the sum of the protection time of the valves 4 to 9 of the first converter 3, and the time it takes the DC current I to become zero. The waveform of the output signal of the delay stage 63 is shown in FIG. 16. The rising flanks of the individual pulses in FIG. 16 coincide in time with the falling flanks of the pulses in FIG. 15.

The output signal of the delay stage 63 is transmitted to the input of the ring distributor 72 via the inverter stage 83. In dependence on the rising flanks of the pulses in FIG. 16 and, hence, the falling flanks of the pulses in FIG. 15, the ring distributor 72 forms the firing pulses p10 for the valves 4 to 9 and distributes them to the p channels or ignition lines. Thus, for example, distributor 72 forms the firing pulses p7 for the valve 7 shown in FIG. 9. As indicated, pulses p7 comprise per period T two succeeding pulses of about T/6 in length which are separated by a safety spacing s.

As shown in FIG. 19, the output signal of the inverter stage 82 is also fed to the delay stage 64, the latter stage being followed by the inverter stage 85. The delay stage 64 has a delay t4 which is generally very short. The delay time t4 determines the time during which a firing pulse is present at the auxiliary valve 38 and the quenching valve 33. The waveform of the output signal of the delay stage 64 is shown in FIG. 17. The rising flanks of the individual short pulses in FIG. 17 coincide in time with the falling flanks of the pulses in FIG. 15. After inversion, the output signal shown in FIG. 17 is the firing signal p38 for the auxiliary valve 38, as comparison with FIG. 10 will show.

In the following further consideration of FIG. 19, it will be assumed that the current regulator 48 in FIG. 1 is a limit indicator with hysteresis, i.e., a bang-bang control. This is already indicated symbolically in FIG. 1 in the block of the current regulator 48. The current regulator 48 is thus assumed to be designed so that it delivers a 1-signal if the actual current value i is smaller than the setpoint value $i^*$ of the current, and so that it delivers a O-signal if the actual current value i is larger than the setpoint value. This O-signal is then to cause the DC control device 24 to be cut off, so that the current i can decay.

As shown in FIG. 19, the control signal v is fed to the first input of the memory stage 66. To the second input of the memory stage is fed the output signal of the delay stage 61 shown in FIG. 14. The memory stage 66 is constructed in the form of a flipflop circuit comprising two NAND gates 67, 68 which are interconnected in such a way that a 1-signal appears at the flipflop output if the control signal v is a O-signal and the other input signal from the delay stage 61 is a 1-signal, and in such way that a D-signal appears at its output if the control signal v is a 1-signal and the other input signal is a O-signal. In other words, during the time between two pulses in FIG. 14, the output of the memory stage 66 delivers the inverse of the control signal v, the signal state being a function of the actual current value i. Or expressed differently, during the period t1 of the individual pulses in FIG. 14, there is either a 1-signal at the output of the memory stage 66, in which case this signal state remains, regardless of the control signal v; or there is a O-signal, in which case the output signal jumps to the 1-state at the next change of the control signal v. This 1-signal corresponds to the cut-off state of the DC control device 24.

As indicated a 1-signal at the output of the memory state 66 is further processed by the control unit 40 to derive the firing pulse p33 for the quenching valve 33 and a O-signal at such output is further processed to derive a firing pulse p30 for the main valve 30. Accordingly, the memory stage 66 operates such that the DC control device 24 can only be cut off, but not switched into conduction, during the period t1.

More specifically, the output signal of the memory stage 66 is fed to the first input of the NAND gate 69. The second input is addressed by the output signal of the inverter stage 82 and the third input by the output signal of the inverter stage 83. The NAND gate 69 ensures that the DC control device 24 is cut off if a O-signal is present at one of its three inputs. During the time ($t2 + t3$), no firing pulse $p30$ for the main valve 30 can thereby be formed.

The output of the NAND gate 69 is connected to the first input of the NAND gate 70. The second input of the latter is connected via the inverter stage 84 to the output of the delay stage 65, whose input, in turn, is connected to the output of the inverter stage 83. The delay time $t5$ of the delay stage 65 is a safety period. It is determined by taking into consideration the time which lies between the firing of the main valve 30 (see FIG. 12) and the point in time when the auxiliary valve 38 is extinguished. During this time t5, the DC control device 24 is conducting regardless of whether the control signal v is a O-signal or a 1-signal.

The waveform of the output signal of the delay stage 65 is shown in FIG. 18. During the time $t5$, the DC control device 24 is conducting. Between the falling flank of a pulse in FIG. 18 and the rising flank of the following pulse in FIG. 14, the current regulation is fully effective.

The output signal of the NAND gate 70 furnishes the firing pulses $p30$ for the main valve. This output signal is also used to feed one input of the NAND gate 71. The other input of gate 71 is addressed by the inverted output signal of the delay stage 64. The output signal of the NAND gate 71 comprises the firing pulses $p33$ for the quenching valve 33.

The logic members shown in FIG. 19 are also advantageously equipped with dynamic input stages, which stages have been omitted in the drawing in the interst of preserving clarity. These dynamic input stages ensure that the duration of the individual firing pulses $p30$, $p33$ and $p38$ is limited to an adjustable value.

What is claimed is:

1. A commutation circuit for a frequency converter comprising:
    a p-pulse converter including controllable valves, first and second inputs, and an output adapted to be connected to a load;
    a DC voltage source for supplying a constant DC voltage, said voltage source having first and second output terminals;
    an intermediate DC link connected between said DC voltage source and said p-pulse converter, said link comprising:
    a smoothing choke connecting the first output terminal of said DC voltage source to said first input of said p-pulse converter;
    a DC control means for controlling the DC current in said link and connecting the second output terminal of said DC voltage source to said second input of said p-pulse converter, said DC control means comprising:
    a controllable main valve, and a quenching arrangement for quenching said main valve, said arrangement being shunted across said main valve and including a quenching capacitor connected in series with a controllable quenching valve, said quenching capacitor having one electrode connected to said second input of said p-pulse converter,
    and a bypass valve connected in series with said smoothing choke, said series connection of said bypass valve and smoothing choke being connected between said first and second inputs of said p-pulse converter and said bypass valve being poled in the direction of said second input,
    and a controllable auxiliary valve connected between the other electrode of said quenching capacitor and said first input of said p-pulse converter such that when said auxiliary valve is fired the voltage of said quenching capacitor is present as a cut-off voltage at said controllable valves of said p-pulse converter, said quenching capacitor thereby acting additionally as a quenching capacitor for the sum-quenching of said controllable valves.

2. A commutation circuit in accordance with claim 1, in which:
    said DC control means has a clock frequency which is at least $p$ times the output frequency of said p-pulse converter;
    and said auxiliary valve and said quenching valve are fired simultaneously every 360° el/p.

3. A commutation circuit in accordance with claim 1 further including:
    means for developing a first frequency control signal;
    a first control unit responsive to first control signal for developing firing pulses for said main valve and for said quenching valve;
    and a second control unit responsive to said first control signal for developing firing pulses for said controllable valves of said p-pulse converter;
    said firing pulses for said valves being developed by said respective first and second control units so as to be in partial synchronism with each other.

4. A commutation circuit in accordance with claim 3 in which:
    said commutation circuit further includes means for generating a second control signal representative of the duty cycle of said DC control device;
    said means for developing is a frequency generator whose output forms said first control signal and has a frequency which is p times the frequency of the output frequency of said p-pulse converter;
    and said first and second control units are included in a common unit responsive to said first and second control signals.

5. A commutation circuit in accordance with claim 4 in which said second control signal is a binary signal and said common control unit includes:
    a memory device having one input fed by said second control signal;
    and a time delay device having an input connected to said frequency generator and an output connected to the other input of said memory device.

6. A commutation circuit in accordance with claim 4 in which said common control unit includes:
    at least one time delay device which is responsive to the output of said frequency generator;
    and a ring distributor responsive to the output of said time delay device for forming the firing pulses for said controllable valves of said p-pulse converter.

* * * * *